(No Model.)

J. H. EDWARDS.
INSECT TRAP.

No. 473,920.　　　　　　　　　　　Patented May 3, 1892.

Witnesses:

Inventor
Joseph H. Edwards,
By his Attorneys,
C. A. Snow & Co.

UNITED STATES PATENT OFFICE.

JOSEPH H. EDWARDS, OF GIDDINGS, TEXAS.

INSECT-TRAP.

SPECIFICATION forming part of Letters Patent No. 473,920, dated May 3, 1892.

Application filed December 5, 1891. Serial No. 414,132. (No model.)

*To all whom it may concern:*

Be it known that I, JOSEPH H. EDWARDS, a citizen of the United States, residing at Giddings, in the county of Lee and State of Texas, have invented a new and useful Insect-Trap, of which the following is a specification.

The invention relates to improvements in insect-traps.

The object of the present invention is to provide a simple, inexpensive, and effective trap for catching such insects as are attracted by light, more especially cotton-flies, potato-bugs, and the like.

The invention consists in the construction and novel combination and arrangement of parts hereinafter fully described, illustrated in the accompanying drawings, and pointed out in the claim hereto appended.

Figure 1:
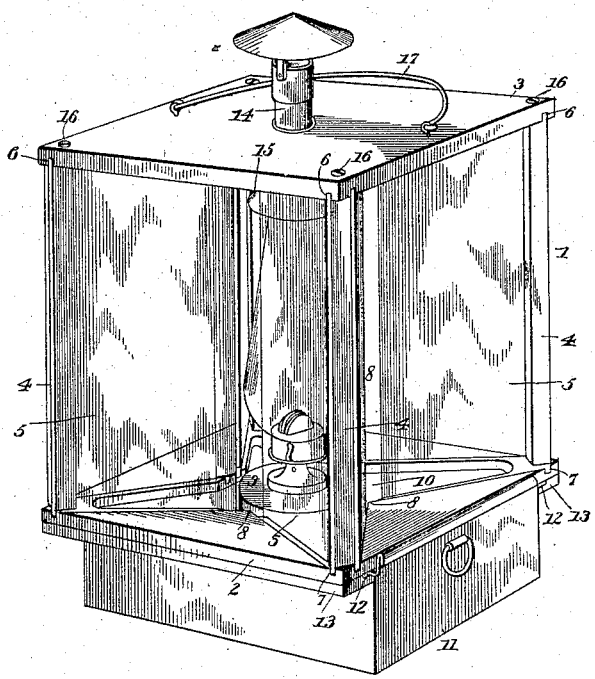
Figure 2:
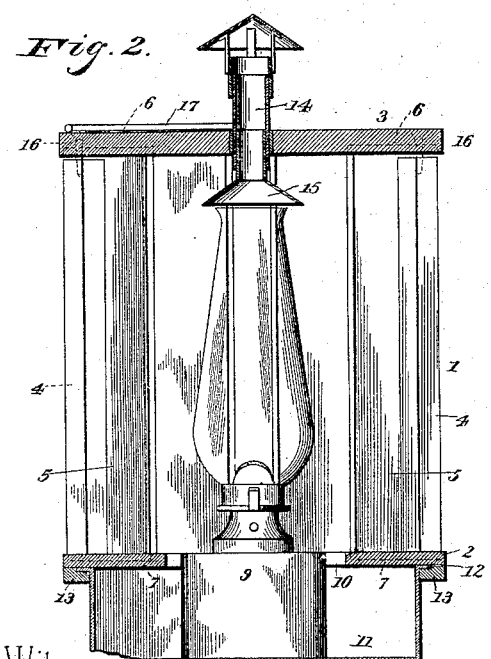
Figure 3:
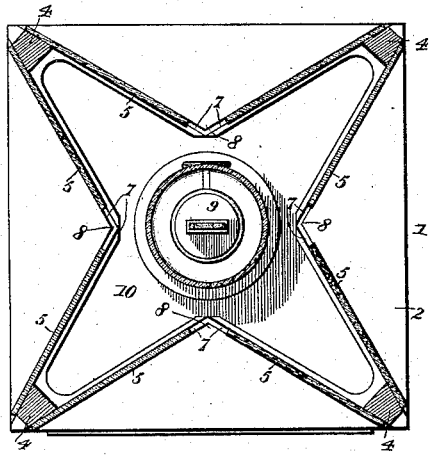

In the drawings, Figure 1 is a perspective view of an insect-trap constructed in accordance with this invention. Fig. 2 is a vertical sectional view. Fig. 3 is a horizontal sectional view.

Like numerals of reference indicate corresponding parts in all the figures of the drawings.

1 designates a frame comprising a bottom 2, a top 3, uprights 4, secured to the bottom 2 and supporting the top, and angularly-disposed transparent panes 5 of glass or similar material arranged at angles and forming re-entrant walls. The transparent walls 5 are arranged in pairs at each side of the frame and are adjustably mounted in grooves 6 and 7 of the top 3 and bottom 2 of the frame, and the walls of each pair have their adjacent vertical edges arranged a short distance apart to provide entrances 8. A lamp 9 is centrally arranged in the frame and attracts insects, which enter the frame and drop through an opening 10 of the bottom 2 into a removable box or drawer 11, which is placed beneath the bottom and supports the frame, and is designed to contain water or some other liquid to drown the insects. The opening 10 is star-shaped, and the lamp is arranged in the center of the same and is supported on the bottom of the drawer 11, which is provided at the upper edges of its sides with flanges 12, arranged in grooves of cleats 13, secured to the bottom 2. The trap is designed more especially for catching cotton-flies, potato-bugs, and the like; but it may be used advantageously as a house-lamp, as the light is unimpaired by the transparent walls, and flies, mosquitos, and other insects will be caught. Above the chimney of the lamp is arranged a telescoping flue 14, having its lower end 15 flared and provided at its upper end with a cowl. The entrance-openings 8 may be made larger or smaller, as desired, by adjusting the transparent walls in the grooves, and the walls are clamped in their adjustment by screws 16, which secure the top 3 to the uprights 4. The trap is provided at its top with a bail 17.

From the foregoing description and the accompanying drawings the construction, operation, and advantages of the invention will be readily understood.

What I claim is—

In a trap, the combination of a frame having a bottom provided with an approximately star-shaped opening, the transparent walls mounted in the frame and forming re-entrant angles and providing entrance-openings and being adjustable to vary the size of the entrance-openings, a receptacle arranged beneath the opening in the bottom of the frame, and a lamp arranged within the frame, substantially as described.

In testimony that I claim the foregoing as my own I have hereto affixed my signature in the presence of two witnesses.

JOSEPH H. EDWARDS.

Witnesses:
JNO. J. DARDEN,
A. B. GREEN.